(12) United States Patent
Wang et al.

(10) Patent No.: US 9,947,244 B2
(45) Date of Patent: Apr. 17, 2018

(54) ADJUSTABLE SPINE JOINT ASSEMBLY FOR CRASH TEST DUMMY

(71) Applicant: Humanetics Innovative Solutions, Inc., Plymouth, MI (US)

(72) Inventors: Zhenwen J. Wang, Farmington Hills, MI (US); Joseph P. McInnis, Ann Arbor, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 274 days.

(21) Appl. No.: 15/080,983

(22) Filed: Mar. 25, 2016

(65) Prior Publication Data

US 2016/0293060 A1 Oct. 6, 2016

Related U.S. Application Data

(60) Provisional application No. 62/142,258, filed on Apr. 2, 2015, provisional application No. 62/222,673, filed on Sep. 23, 2015.

(51) Int. Cl.
| | |
|---|---|
| *G09B 23/28* | (2006.01) |
| *G09B 23/32* | (2006.01) |
| *G09B 23/34* | (2006.01) |

(52) U.S. Cl.
CPC ............. *G09B 23/32* (2013.01); *G09B 23/34* (2013.01)

(58) Field of Classification Search
USPC ................. 434/262, 267, 274; 72/172, 866.4
See application file for complete search history.

(56) References Cited

U.S. PATENT DOCUMENTS

| | | | |
|---|---|---|---|
| 3,740,871 A | 6/1973 | Berton et al. | |
| 3,753,301 A | 8/1973 | Daniel et al. | |
| 3,753,302 A | 8/1973 | Daniel | |
| 3,762,069 A | 10/1973 | Culver | |
| 3,762,070 A * | 10/1973 | Culver | ................... G09B 23/32 434/274 |
| 3,877,156 A | 4/1975 | Itoh | |

(Continued)

FOREIGN PATENT DOCUMENTS

| | | |
|---|---|---|
| DE | 2330093 | 1/1974 |
| DE | 4012691 A1 | 10/1990 |

(Continued)

OTHER PUBLICATIONS

International Search Report dated Jul. 6, 2016, for International Application Serial No. PCT/US 16/25915.

*Primary Examiner* — Kurt Fernstrom
(74) *Attorney, Agent, or Firm* — Howard & Howard Attorneys PLLC

(57) ABSTRACT

An adjustable spine joint assembly for a crash test dummy includes an upper member adapted to be operatively connected to an upper thoracic portion of a spine of the crash test dummy, a lower member adapted to be operatively connected to a lower thoracic portion of the spine of the crash test dummy, a center pivot bolt pivotally connected to the lower member and the upper member to allow rotational movement therebetween, and a self-locating adjustment mechanism cooperating with the upper member and the lower member to allow adjustment of a plurality of fixed joint angles between the upper member and the lower member.

21 Claims, 13 Drawing Sheets

(56) References Cited

U.S. PATENT DOCUMENTS

| | | | |
|---|---|---|---|
| 4,261,113 A | 4/1981 | Alderson | |
| 4,488,433 A | 12/1984 | Denton et al. | |
| 4,948,373 A | 8/1990 | Engels | |
| 5,018,977 A | 5/1991 | Wiley et al. | |
| 5,152,692 A | 10/1992 | Richards | |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,665,922 A | 9/1997 | Tsukada et al. | |
| 5,741,989 A | 4/1998 | Viano et al. | |
| 5,749,628 A | 5/1998 | Synder et al. | |
| 6,422,874 B1 | 7/2002 | Green et al. | |
| 6,439,070 B1 | 8/2002 | Beebe et al. | |
| 6,749,433 B2 | 6/2004 | Kassai et al. | |
| 6,982,409 B2 | 1/2006 | Huang et al. | |
| 7,086,273 B2 | 8/2006 | Lipmyer | |
| 7,878,080 B2 * | 2/2011 | Hwang | G09B 23/32 73/866.4 |
| 7,891,259 B2 * | 2/2011 | Kim | G01M 99/001 73/172 |
| RE42,418 E | 6/2011 | Lipmyer | |
| 8,840,404 B2 | 9/2014 | Arthur et al. | |
| 9,564,069 B2 * | 2/2017 | Wang | G09B 23/32 |
| 9,754,514 B2 * | 9/2017 | Gibbs | G09B 23/32 |
| 2004/0029090 A1 | 2/2004 | Kassai et al. | |
| 2005/0126258 A1 | 6/2005 | Lipmyer | |
| 2009/0025492 A1 | 1/2009 | Hwang et al. | |
| 2013/0000426 A1 | 1/2013 | Arthur et al. | |
| 2013/0252220 A1 | 9/2013 | Wang | |
| 2013/0327164 A1 | 12/2013 | Wang | |
| 2014/0190279 A1 | 7/2014 | Been et al. | |
| 2014/0190280 A1 | 7/2014 | Been et al. | |
| 2014/0294485 A1 | 10/2014 | McInnis et al. | |
| 2015/0086957 A1 | 3/2015 | Gibbs et al. | |

FOREIGN PATENT DOCUMENTS

| | | |
|---|---|---|
| DE | 4117046 A1 | 11/1991 |
| DE | 102004058022 A1 | 6/2005 |
| DE | 102004058022 B4 | 12/2007 |
| DE | 102007062761 B4 | 9/2013 |
| DE | 102013009815 A1 | 12/2013 |
| EP | 0709665 A2 | 5/1996 |
| EP | 1388833 A1 | 2/2004 |
| EP | 1388833 B1 | 9/2009 |
| EP | 1388833 B8 | 11/2009 |
| FR | 2018158 | 5/1970 |
| FR | 2646266 A1 | 10/1990 |
| GB | 1503956 | 3/1978 |
| GB | 2231433 A | 11/1990 |
| GB | 2244843 A | 12/1991 |
| GB | 2231433 B | 5/1993 |
| GB | 2244843 B | 4/1994 |
| GB | 2344922 A | 6/2000 |
| JP | 50114835 | 9/1975 |
| JP | 2005227266 A | 8/2005 |
| JP | 2012202708 A | 10/2012 |
| JP | 2013257322 A | 12/2013 |
| JP | 5664391 B2 | 2/2015 |
| WO | 9830995 A1 | 7/1998 |
| WO | 9847122 | 10/1998 |

* cited by examiner

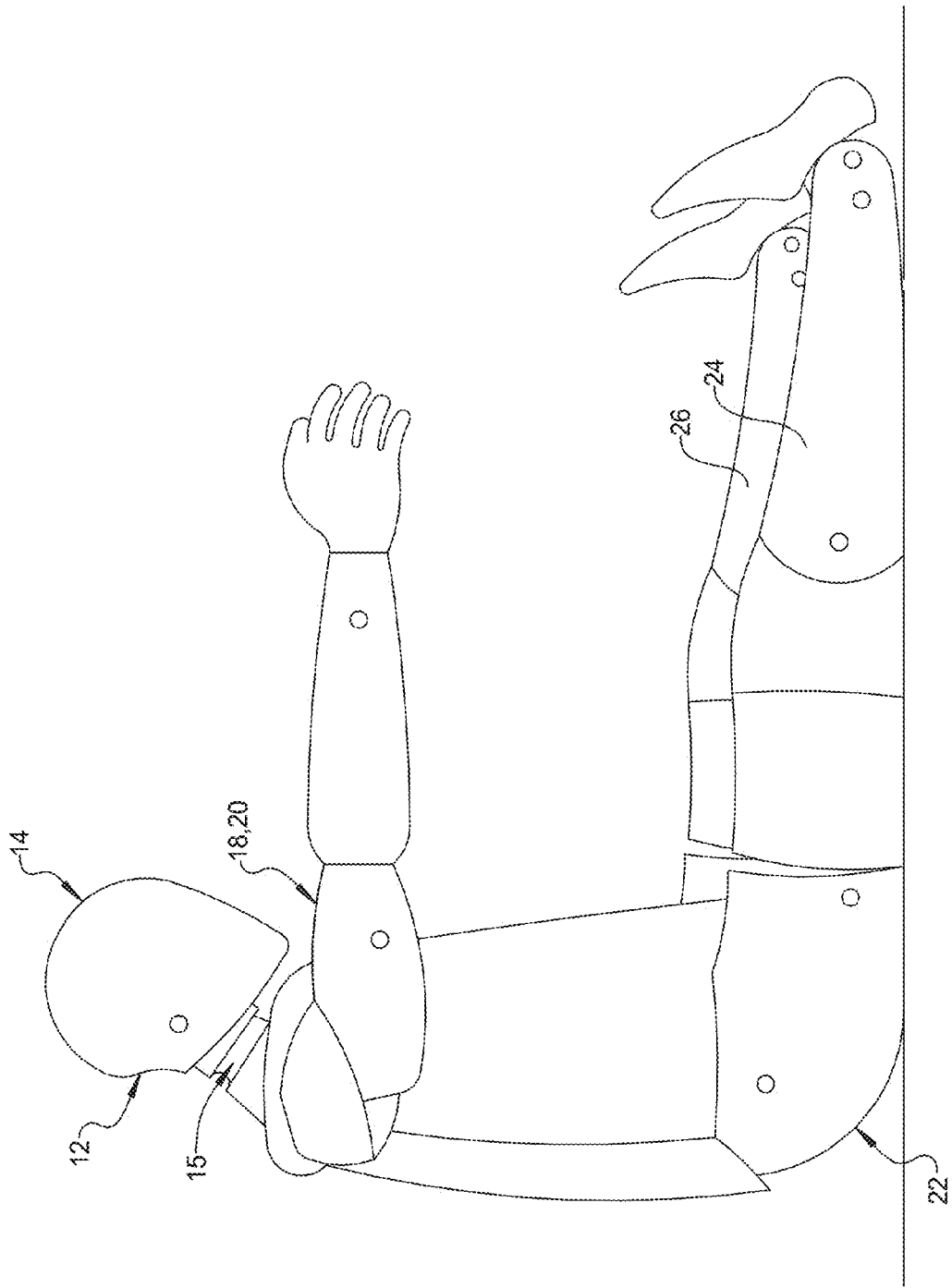

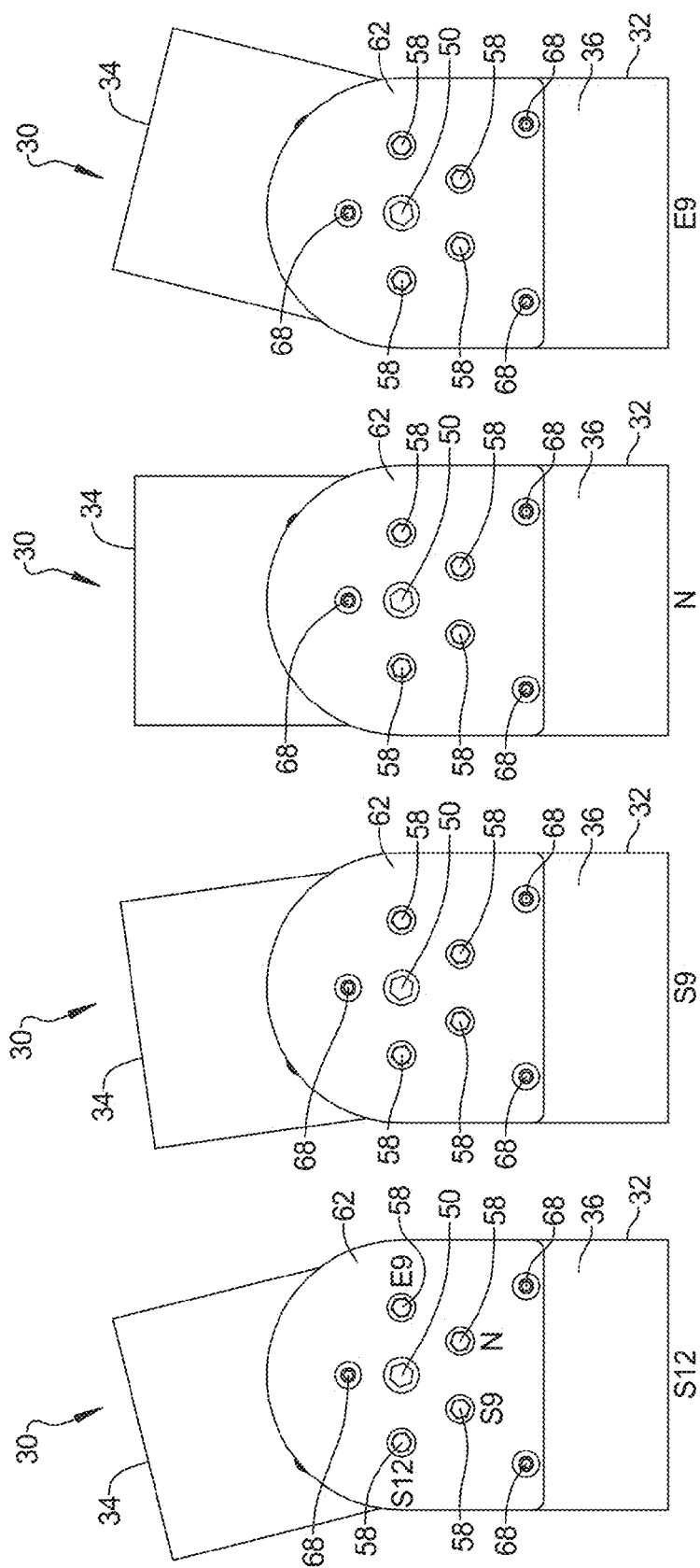

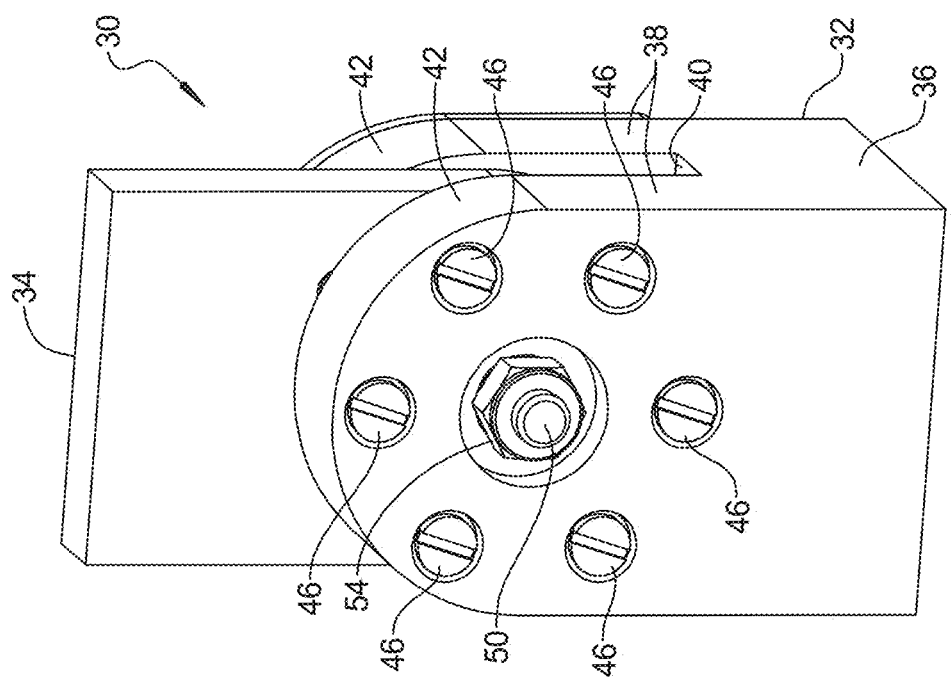
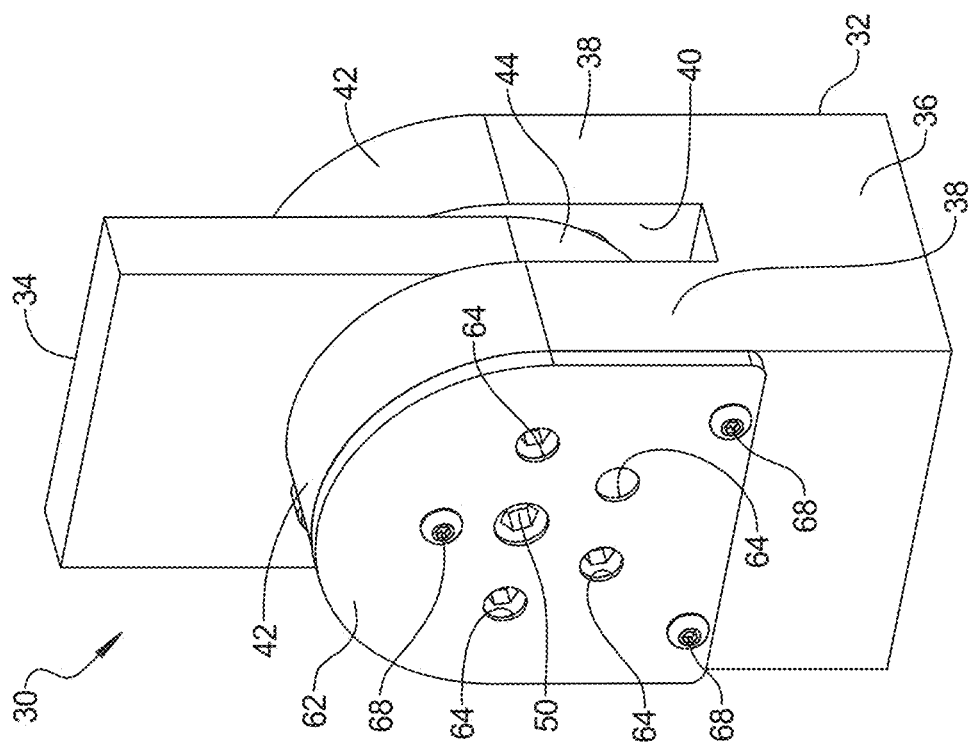

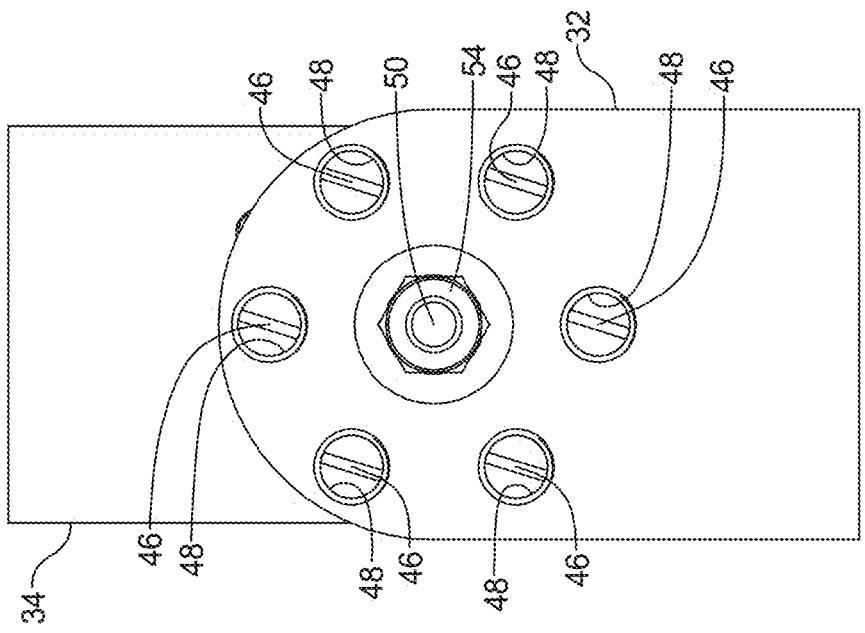
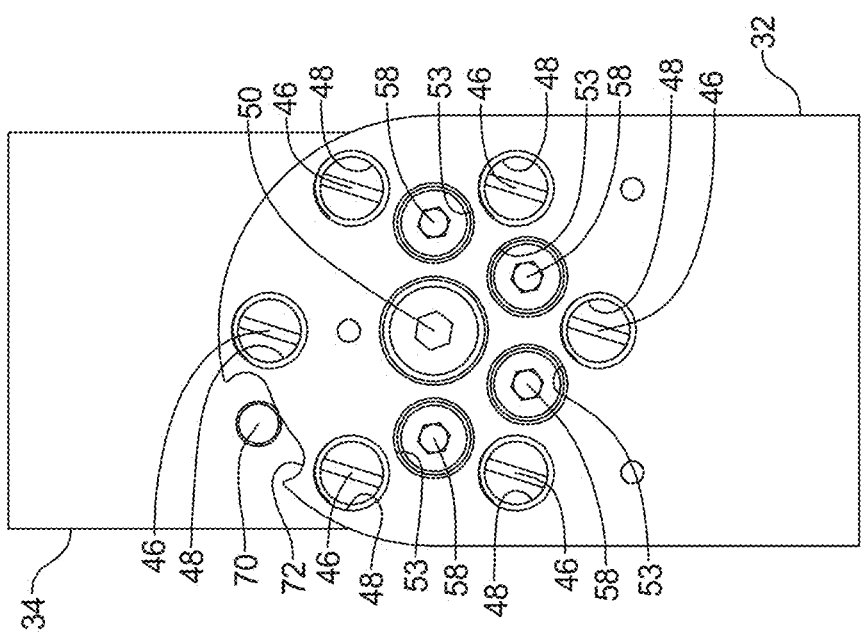

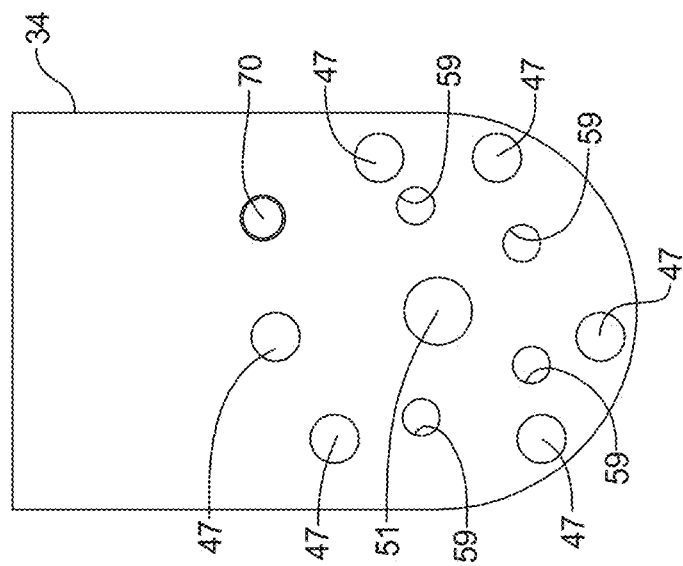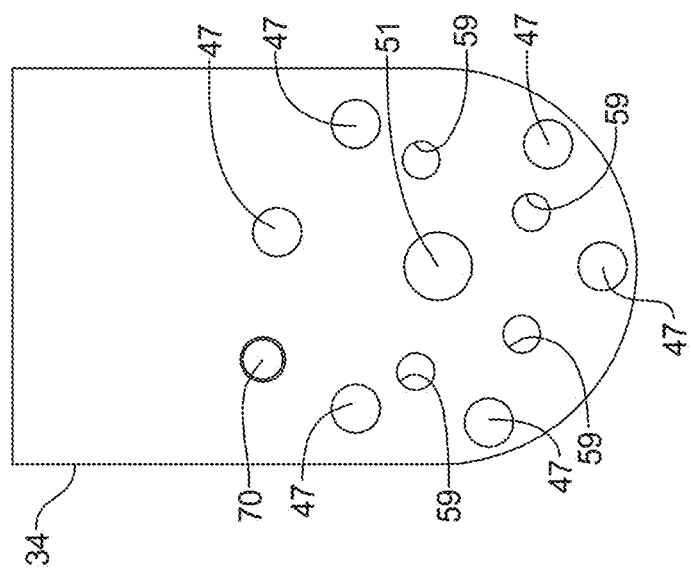

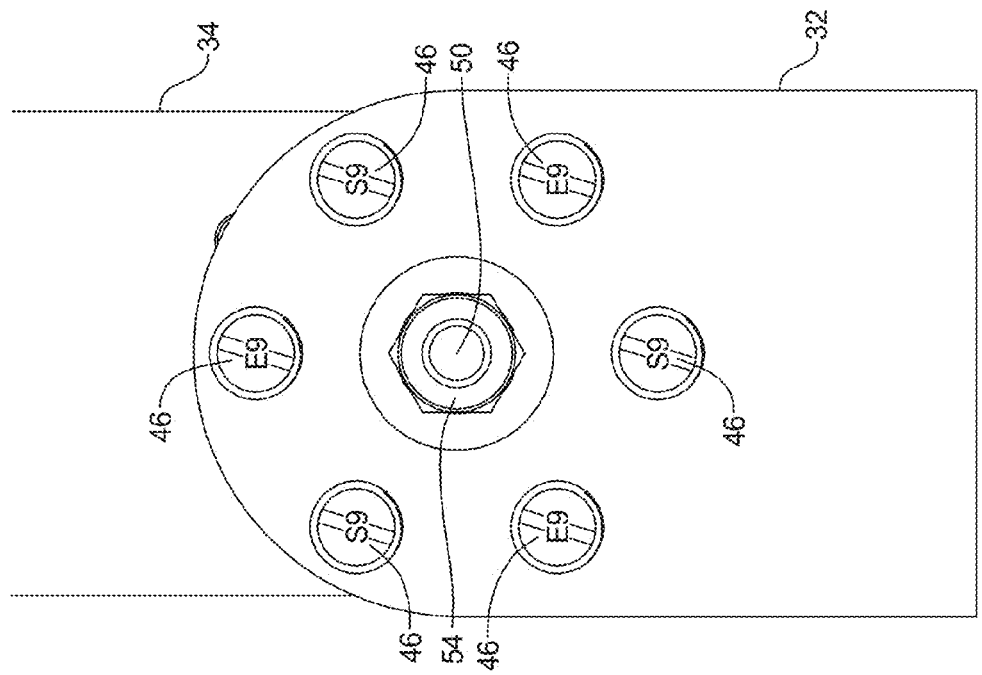
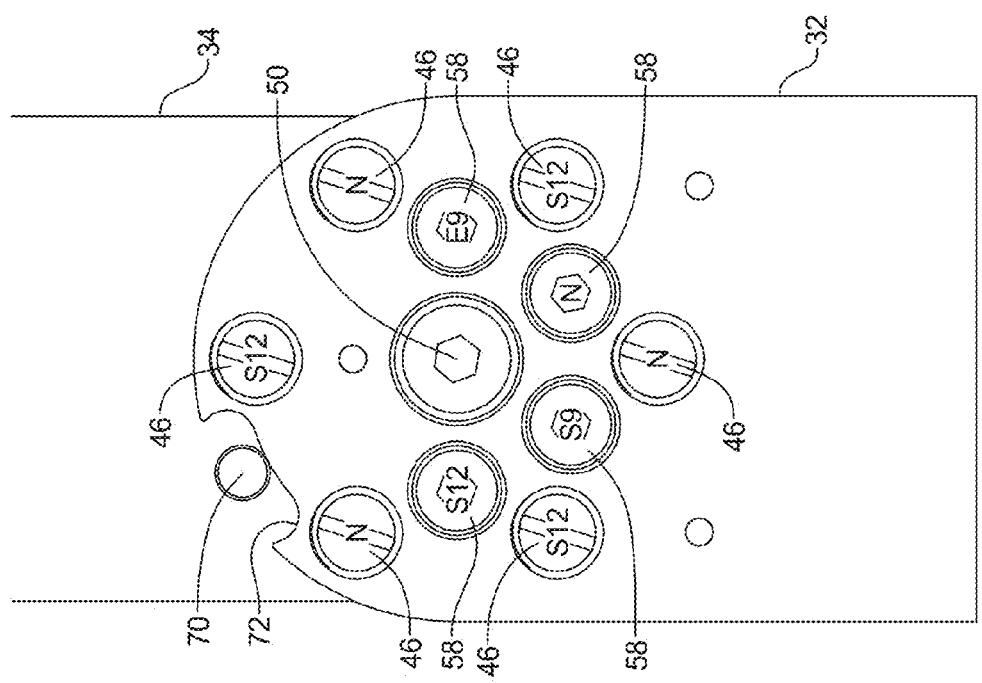

ADJUSTABLE SPINE JOINT ASSEMBLY FOR CRASH TEST DUMMY

CROSS REFERENCE TO RELATED APPLICATIONS

This application claims the benefit of U.S. Provisional Patent Application Ser. No. 62/142,258, filed on Apr. 2, 2015, and U.S. Provisional Patent Application Ser. No. 62/222,673, filed on Sep. 23, 2015, the disclosures of both of which are hereby incorporated by reference in their entirety.

BACKGROUND OF THE INVENTION

1. Field of the Invention

The present invention relates generally to Anthropomorphic Test Devices (ATD) and, more particularly, to an adjustable spine joint assembly for an ATD that can be used to assess and predict injuries under crash, under body explosive, and aerospace ejection seat testing environments.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to submit type approval, and consumer organizations provide information on vehicle safety ratings to the public.

Impact testing often involves the use of anthropomorphic test devices (ATDs), better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angle rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD design engineers design crash test dummies with the proper anthropometry that reflects a total weight, center of gravity, mass moment of inertia and range of motion similar to that of a human body so as to increase the biofidelity of the crash test dummy.

Currently, an ATD design requires a design that allows torso angle adjustment to represent different seating postures. For example, a typical vehicle driver has a seatback at approximately twenty-five (25) degrees reclined. Moreover, a truck has a seatback that is nearly upright. In contrast, a race car seat back may be in a more reclined position. These seat configurations require an ATD to have the ability to adjust the torso angle in order to be able to fit into these seat configurations. The existing ATD design uses a teeth design concept to adjust the torso angles. If a continuous adjustment with small angle increment is necessary, this design offers simplicity. However, difficulties were experienced in operation. The angle adjustment is cumbersome since the two halves of the teeth design have to be completely disengaged to allow any adjustment to happen. No support to the ATD torso is provided from the design when the two halves are apart and the ATD torso tends to fall all the way down and make the adjusting process frustrating for a technician. The existing ATD torso does not offer any position locating feature to assist the alignment. In addition, the teeth of the existing ATD torso are frequently damaged in operation. Thus, there is a need in the art for a new adjustable spine joint assembly for a crash test dummy that provides for a human range of motion.

SUMMARY OF THE INVENTION

Accordingly, the present invention is an adjustable spine joint assembly for a crash test dummy. The adjustable spine joint assembly includes an upper member adapted to be operatively connected to an upper thoracic portion of a spine of the crash test dummy, a lower member adapted to be operatively connected to a lower thoracic portion of the spine of the crash test dummy, and a center pivot bolt pivotally connected to the lower member and the upper member to allow rotational movement therebetween. The adjustable spine joint assembly also includes a self-locating adjustment mechanism cooperating with the upper member and the lower member to allow adjustment between a plurality of fixed joint angles between the upper member and the lower member.

In addition, the present invention is a crash test dummy including a body, a spine operatively attached to the body, and an adjustable spine joint assembly including an upper member operatively connected to an upper thoracic portion of the spine, a lower member operatively connected to a lower thoracic portion of the spine, a center pivot bolt pivotally connected to the lower member and the upper member to allow rotational movement therebetween, and a self-locating adjustment mechanism cooperating with the upper member and the lower member to allow adjustment between a plurality of fixed joint angles between the upper member and the lower member.

One advantage of the present invention is that a new adjustable spine joint assembly is provided for a crash test dummy. Another advantage of the present invention is that the adjustable spine joint assembly provides a self-locating mechanism. Yet another advantage of the present invention is that the adjustable spine joint assembly is more desired for ATD preparation and positioning in vehicle testing. Still another advantage of the present invention is that the adjustable spine joint assembly addresses two major issues, durability and user friendliness.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of one embodiment of a crash test dummy.

FIGS. 4A, 4B, 4C, and 4D are elevational views of the adjustable spine joint assembly of FIGS. 3A and 3B illustrating different adjustment positions.

FIG. 5A is a perspective view of a right side of the adjustable spine joint assembly of FIGS. 3A and 3B.

FIG. 5B is a perspective view of a left side of the adjustable spine joint assembly of FIGS. 3A and 3B.

FIG. 7A is an elevational view of a right side of the adjustable spine joint assembly of FIGS. 3A and 3B with a cover plate and cover plate fasteners removed.

FIG. 7B is an elevational view of a left side of the adjustable spine joint assembly of FIGS. 3A and 3B.

FIG. 7C is an elevational view of a right side of an upper member of the adjustable spine joint assembly of FIGS. 3A and 3B.

FIG. 7D is an elevational view of a left side of the upper member of the adjustable spine joint assembly of FIGS. 3A and 3B.

FIG. 10A is an elevational view of an arrangement of ball plungers and an arrangement of locking bolts on the right side of the adjustable spine joint assembly of FIGS. 3A and 3B.

FIG. 10B is an elevational view of an arrangement of ball plungers on the left side of the adjustable spine joint assembly of FIGS. 3A and 3B.

DESCRIPTION OF THE PREFERRED EMBODIMENT(S)

Figure 1A:
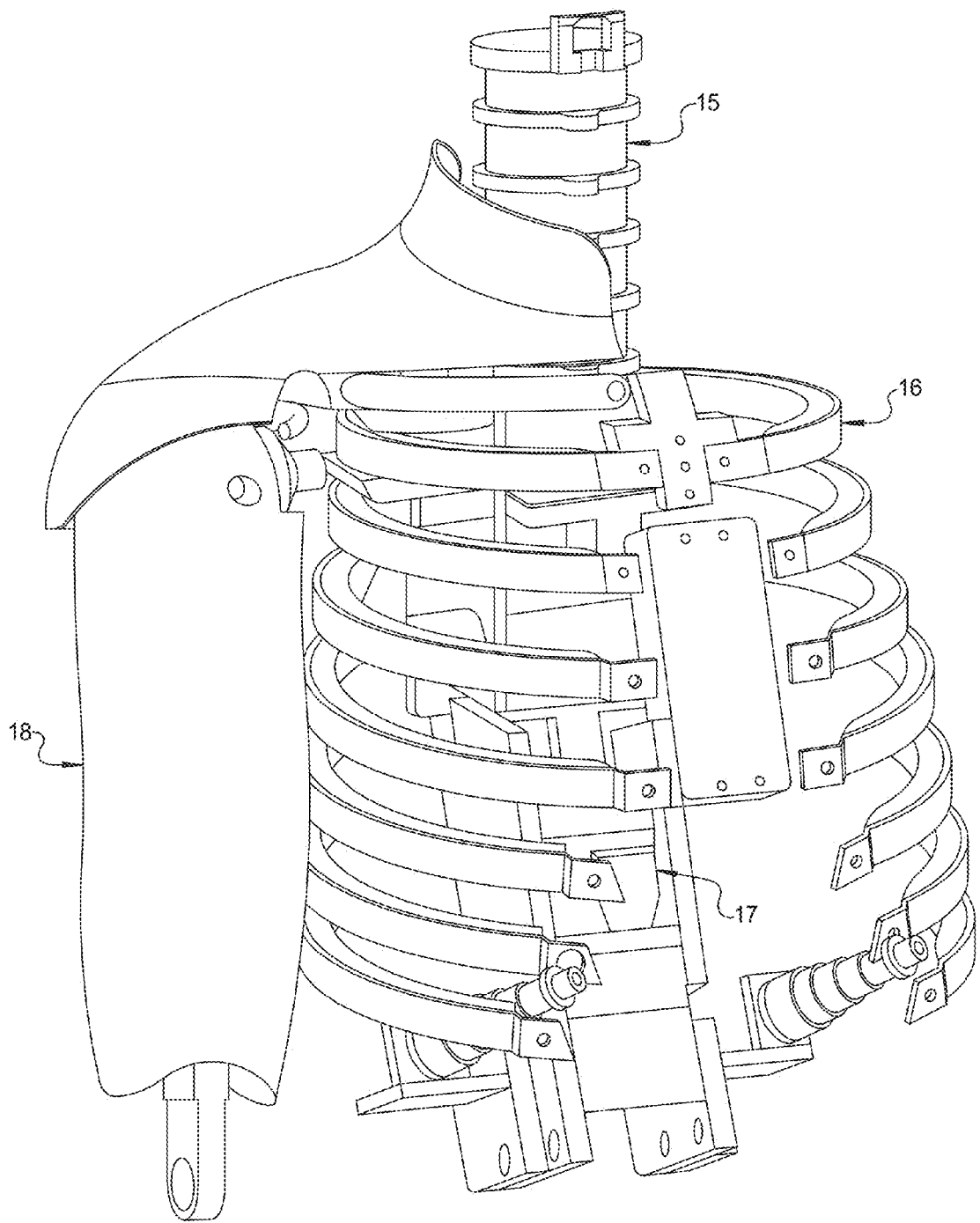
FIG. 1A is a perspective view of a portion of the crash test dummy of FIG. 1.

Referring to the drawings and in particular FIGS. 1 and 1A, one embodiment of a crash test dummy is generally indicated at 12. The crash test dummy 12 is of a fiftieth percentile (50%) male type and is illustrated in a seated position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIGS. 1 and 1A, the crash test dummy 12 includes a head assembly, generally indicated at 14. The crash test dummy 12 also includes a neck assembly, generally indicated at 15, having an upper end mounted to the head assembly 14. The crash test dummy 12 also includes a spine assembly, generally indicated at 17, having an upper end mounted to the neck assembly 15 via a neck pitch change mechanism assembly (not shown). The spine assembly 17 has a lower end extending into a torso area of the crash test dummy 12 and is connected to a thoracic spine load cell.

The torso area of the crash test dummy 12 includes a rib cage assembly 16 connected to the spine assembly 17. The crash test dummy 12 also has a pair of arm assemblies including a right arm assembly 18 and a left arm assembly 20, which are attached to the crash test dummy 12. It should be appreciated that the right arm assembly 18 and left arm assembly 20 are connected through a right shoulder assembly and left shoulder assembly, respectively, to the top of the spine assembly 17.

The crash test dummy 12 further includes a pelvis assembly 22 connected to a pelvis/lumbar spine mounting block of the spine assembly 17. The crash test dummy 12 includes a right leg assembly 24 and a left leg assembly 26, which are attached to the pelvis assembly 22. It should be appreciated that various components of the crash test dummy 12 are covered in a urethane skin such as a flesh and skin assembly (not shown) for improved coupling with the skeleton of the crash test dummy 12. It should also be appreciated that a lifting bracket (not shown) may be attached to an upper portion of the spine assembly 17 for lifting the crash test dummy 12 into and out of test fixtures and vehicles.

Figure 2:
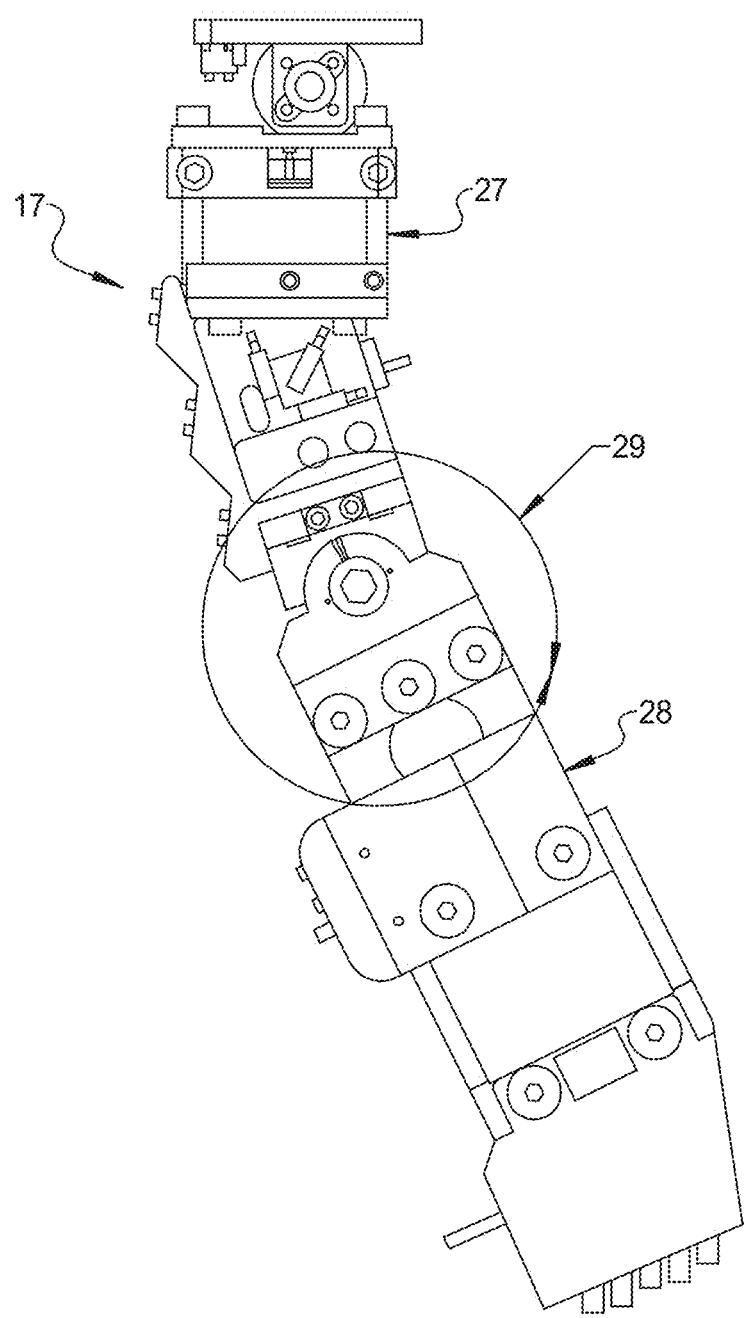
FIG. 2 is an elevational view of a spine joint assembly of the crash test dummy of FIGS. 1 and 1A.

Referring to FIG. 2, the spine assembly 17 represents a human spine. The spine assembly 17 includes an upper thoracic assembly 27 and a pelvis/lumbar spine mounting assembly 28. The spine assembly 17 may include additional components such as a spine joint 29 disposed between the upper thoracic assembly 27 and the pelvis/lumbar spine mounting assembly 28. The spine joint 29 is replaced by an adjustable spine joint assembly 30, according to the present invention, to be described in FIGS. 3A through 10B. It should be appreciated that, except for the adjustable spine joint assembly 30 according to the present invention, the remaining components of the spine assembly 17 are conventional.

Figure 3B:
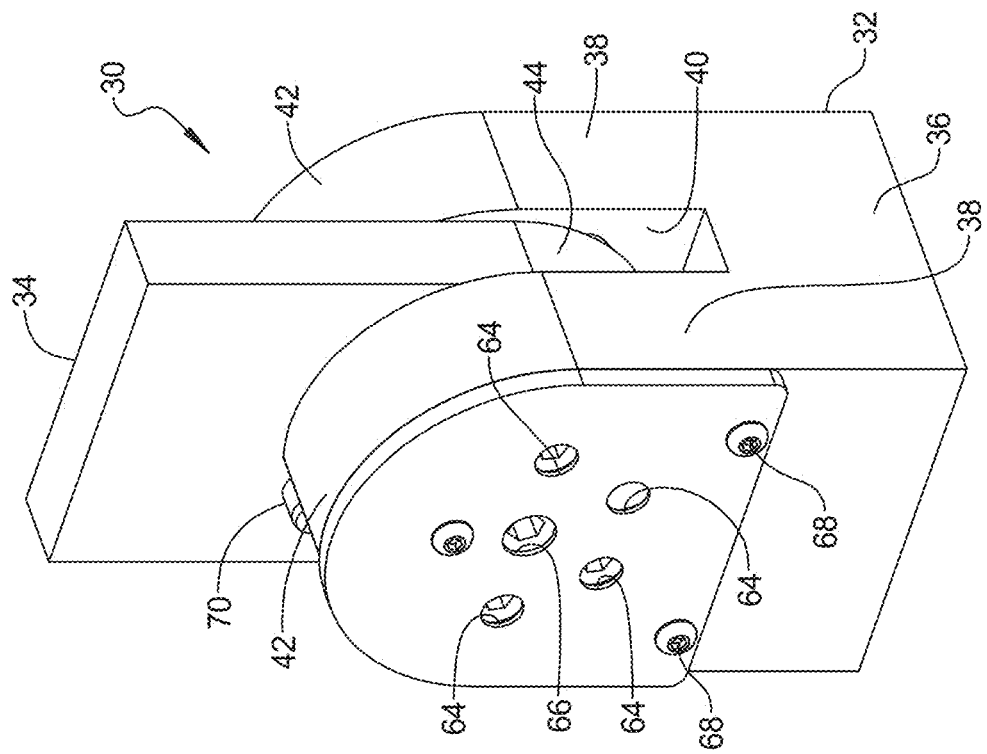
FIGS. 3A and 3B are perspective views of an adjustable spine joint assembly, according to one embodiment of the present invention, to replace the spine joint assembly of FIG. 2 for the crash test dummy of FIG. 1.
Figure 3A:
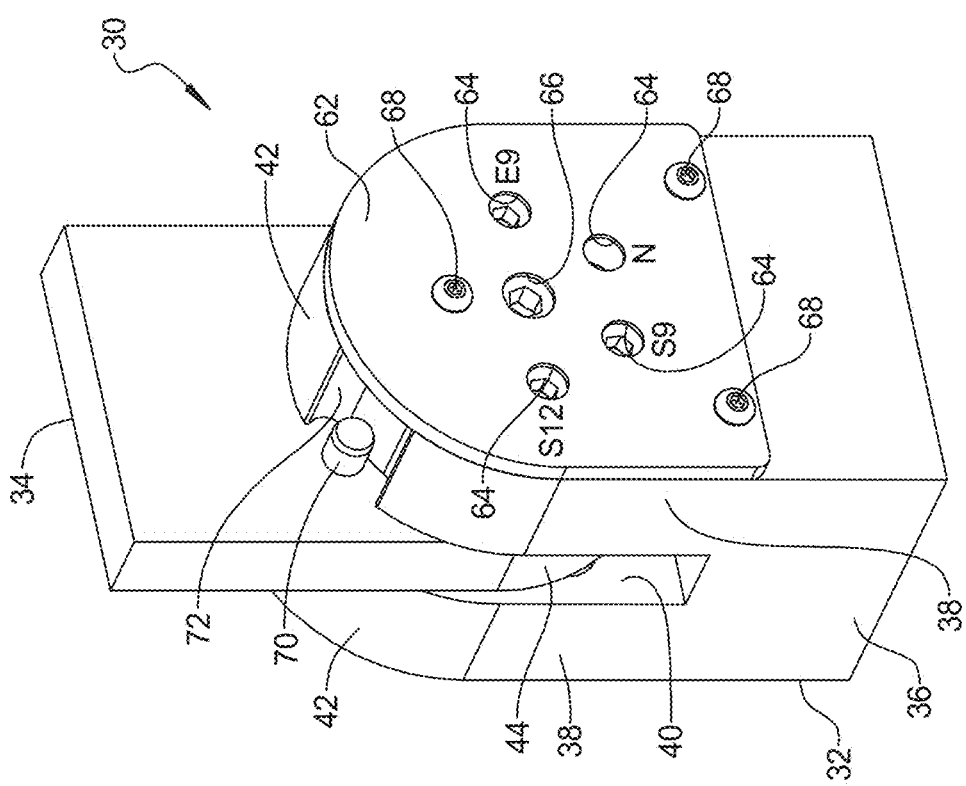

Referring to FIGS. 3A through 3B, one embodiment of an adjustable spine joint assembly 30, according to the present invention, is shown for the spine assembly 17 of the crash test dummy 12. The adjustable spine joint assembly 30 includes a yoke joint formed by a first or lower member 32 and a second or upper member 34. The lower member 32 includes a base portion 36 and a pair of side portions 38 extending from the base portion 36 and spaced from each other to form a space 40 therebetween. The side portions 38 have an upper end 42 that are generally arcuate in shape. The upper member 34 is a generally planar plate disposed in the space 40 between the side portions 38. The upper member 34 has a lower end 44 that is generally arcuate in shape.

Figure 6:
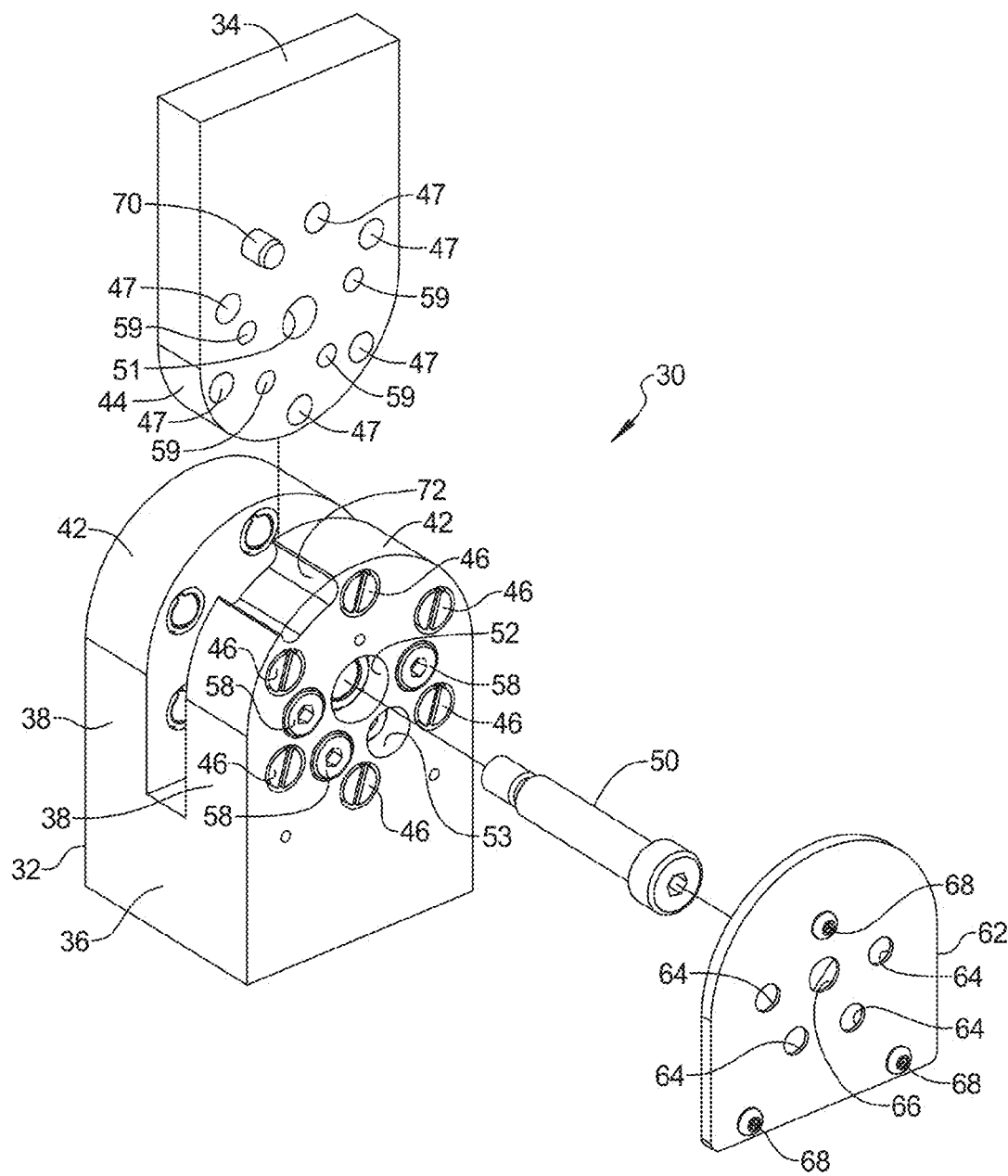
FIG. 6 is an exploded perspective view of the adjustable spine joint assembly of FIGS. 3A and 3B.

As illustrated in FIG. 6, the adjustable spine joint assembly 30 includes a center pivot fastener or bolt 50 extending through a center aperture 52 in the side portions 38 of the lower member 32 and a center aperture 51 of the upper member 34 to pivotally connect the lower member 32 and upper member 34 together. The adjustable spine joint assembly 30 further includes a fastener such as a nut 54 and washers 56 (FIG. 9) cooperating with center pivot bolt 50 to keep the bolt 50 from exiting the lower member 32 and the upper member 34. It should be appreciated that the center pivot bolt 50 allows rotation or pivotal movement between the lower member 32 and the upper member 34.

In one embodiment of the present invention, four positions are designed for a thoracic and lumbar joint (T12/L1). The upper thoracic assembly 27 and the pelvis/lumbar spine mounting assembly 28 define an angle therebetween, hereinafter referred to as a torso angle. In one embodiment of the present invention, a neutral angle defines a torso angle of ninety (90) degrees. In one embodiment of the present invention, a slouched position defines any position where the torso angle is greater than ninety (90) degrees. The measurement of a slouched position ranges from zero (0) degrees to ninety (90) degrees slouched with zero (0) degrees slouched equivalent to a ninety (90) degree torso angle and ninety (90) degrees slouched equivalent to a one hundred eighty (180) degree torso angle. In one embodiment of the present invention, an erect position defines any position where the torso angle is less than ninety (90) degrees. The measurement of an erect position ranges from zero (0) degrees to ninety (90) degrees erect with zero (0) degrees erect equivalent to a ninety (90) degree torso angle and ninety (90) degrees erect equivalent to a zero (0) degree torso angle.

The angle of the upper member 34 relative to the lower member 32 correlates to the torso angle of the upper thoracic assembly 27 relative to the pelvis/lumbar spine mounting assembly 28 of the adjustable spine joint assembly 30. The adjustable spine joint assembly 30 is capable of adjusting the torso angle in the following four positions, twelve (12) degrees slouched position (designed as S12) as illustrated in FIG. 4A, nine (9) degrees slouched position (S9) as illustrated in FIG. 4B, neutral position (N) as illustrated in FIG. 4C, and nine (9) degrees erect position (E9) as illustrated in FIG. 4D. It should be appreciated that the adjustable spine joint assembly 30 replaces the spine joint 29 of the spine assembly 17 illustrated in FIG. 2. It should also be appreciated that any torso angle between a ninety (90) degrees slouched position and a ninety (90) degrees erect position may be achieved without departing from the scope of the present invention.

Figure 9:
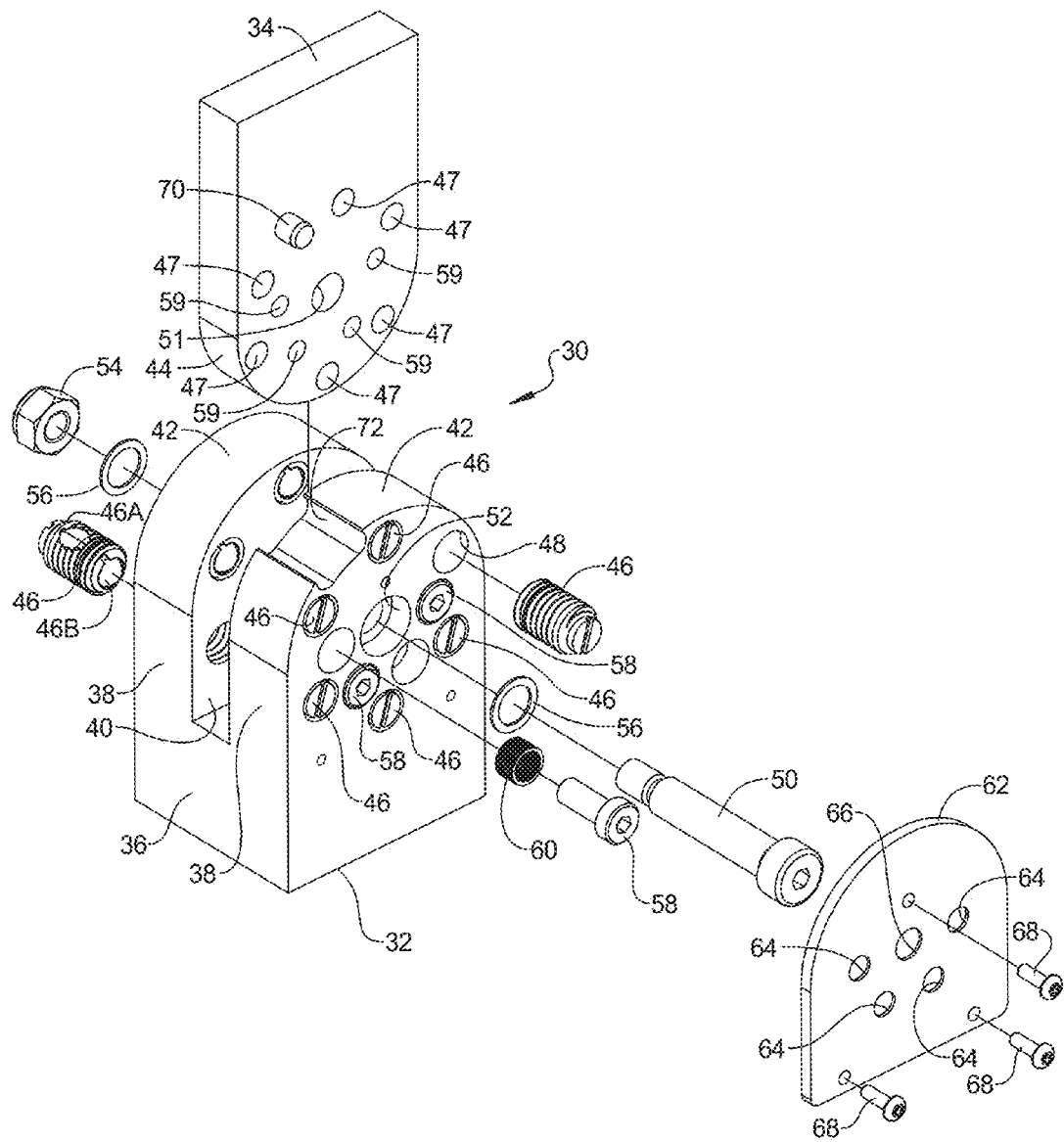
FIG. 9 is an exploded perspective view of the adjustable spine joint assembly of FIGS. 3A and 3B.

Referring to FIGS. 7A and 7B, the adjustable spine joint assembly 30 includes a plurality of ball plungers 46 and a plurality of detents 47 to self-locate the desired position for the joint. The collective sets of ball plungers 46 and their corresponding detents 47 constitute a self-locating mechanism. The ball plungers 46 extend through apertures 48 on each of the side portions 38 of the lower member 32. The ball plungers 46 threadably engage the apertures 48. As illustrated in FIG. 9, the ball plungers 46 have a housing 46A and a movable ball 46B disposed in the housing 46A and biased by a spring (not shown). The ball partially extends through an open end of the housing. Further, the ball partially extends into the space 40 between the two side portions 38, contacting the upper member 34 on each side. As shown in FIGS. 7C and 7D, the detents 47 are small, round recesses that are indented into the upper member 34 on each side of the upper member 34 for receiving the ball plungers 46.

In one embodiment, the adjustable spine joint assembly 30 includes four sets of ball plungers 46, two sets on each side portion 38 of the lower member 32. Each set includes three ball plungers 46 and designates a torso angle position (S12, S9, N, E9). The multiple ball plungers 46 (3 as shown) in each set are able to provide enough engagement force to support the ATD torso against gravity so that the ATD torso will not fall during ATD handling. As illustrated in FIGS. 10A and 10B, the two sets of ball plungers 46 on each side portion 38 of the lower member 32 are arranged in a circular pattern that is concentric to the center aperture 52 of the side portions 38 such that a ball plunger 46 is located every sixty (60) degrees around the center aperture 52 of the side portions 38 of the lower member 32. Further, the ball plungers 46 of each set are arranged such that each ball plunger 46 in a set of ball plungers 46 is located every one hundred twenty (120) degrees around the center aperture 52 of the side portions 38. As illustrated, the two sets of ball plungers 46 on each side portion 38 alternate sets every sixty (60) degrees. The two sets of ball plungers 46 on one side portion 38 of the lower member 32 are symmetrical to the two sets of ball plungers 46 on the other side portion 38. In one embodiment, the set of ball plungers 46 for the Neutral torso angle position (N) and the set of ball plungers 46 for the twelve (12) degrees slouched torso angle position (S12) are on the right side. The set of ball plungers 46 for the nine (9) degrees slouched torso angle position (S9) and the set of ball plungers 46 for the nine (9) degrees erect torso angle position (E9) are on the left side.

As illustrated in FIGS. 7C and 7D, the upper member 34 of the adjustable spine joint assembly 30 includes four sets of detents 47, two sets on each side of the upper member 34. Each set includes three detents 47 and designates a torso angle position (S12, S9, N, E9) corresponding to the identically designated set of ball plungers 46. In one embodiment, the detents 47 of each set are arranged in a circular pattern that is concentric to the center aperture 51 of the upper member 34 such that each detent 47 in a set of detents 47 is located every one hundred twenty (120) degrees around the center aperture 51 of the upper member 34. Unlike the ball plungers 46, the angle between detents 47 of different sets on each side of the upper member 34 is not sixty (60) degrees. Further, the two sets of detents 47 are not symmetrical to each other. The arrangement of the detents 47 around the center aperture 51 of the upper member 34 permits the self-locating mechanism to engage a maximum of one set of ball plungers 46 at a time. It should be appreciated that the arrangement of the ball plungers 46 and detents 47 may be in any pattern or symmetry that allows for self-locating of torso angle positions of an adjustable spine joint assembly 30 without departing from the scope of the present invention.

Referring to FIG. 9, the adjustable spine joint assembly 30 includes a position locking fastener or bolt 58 for each torso angle position (S12, S9, N, E9). The adjustable spine joint assembly 30 also includes a wave spring washer 60 for each locking bolt 58. The locking bolts 58 extend through apertures 53 of one of the side portions 38 and threadably engage the apertures 59 of the upper member 34 when in use. The wave spring washers 60 are disposed within the apertures 53 of one of the side portions 38 of the lower member 32 and restrict the locking bolts 58 from threadably engaging the apertures 59 of the upper member 34 when the adjustable spine joint assembly 30 is being adjusted or when the adjustable spine joint assembly 30 is not in use.

As illustrated in FIG. 10A, the locking bolts 58 are arranged in a circular pattern between the center aperture 52 and the apertures 48 of the lower member 32. In one embodiment, the adjustable spine joint assembly 30 includes four locking bolts 58. The apertures 59 of the upper member 34 are arranged in a circular pattern between the center aperture 51 and detents 47 of the upper member 34. Further, the apertures 59 of the upper member 34 are arranged such that only one locking bolt 58 is engageable with one of the apertures 59 at a time. More specifically, only the locking bolt 58 designated for the torso angle position (S12, S9, N, E9) that the adjustable spine mounting assembly 30 is in may be engaged. In one embodiment, when the torso angle is in one of the desired angular positions (S12, S9, N, E9), only the corresponding locking bolt 58 may engage the aperture 59 of the upper member 34. It should be appreciated that the design of the adjustable spine joint assembly 30 may be applied, but is not limited, to other ATD joints such as cervical and thoracic spine joint (C7/T1), knee joint, and elbow joint, etc.

Figure 8A:
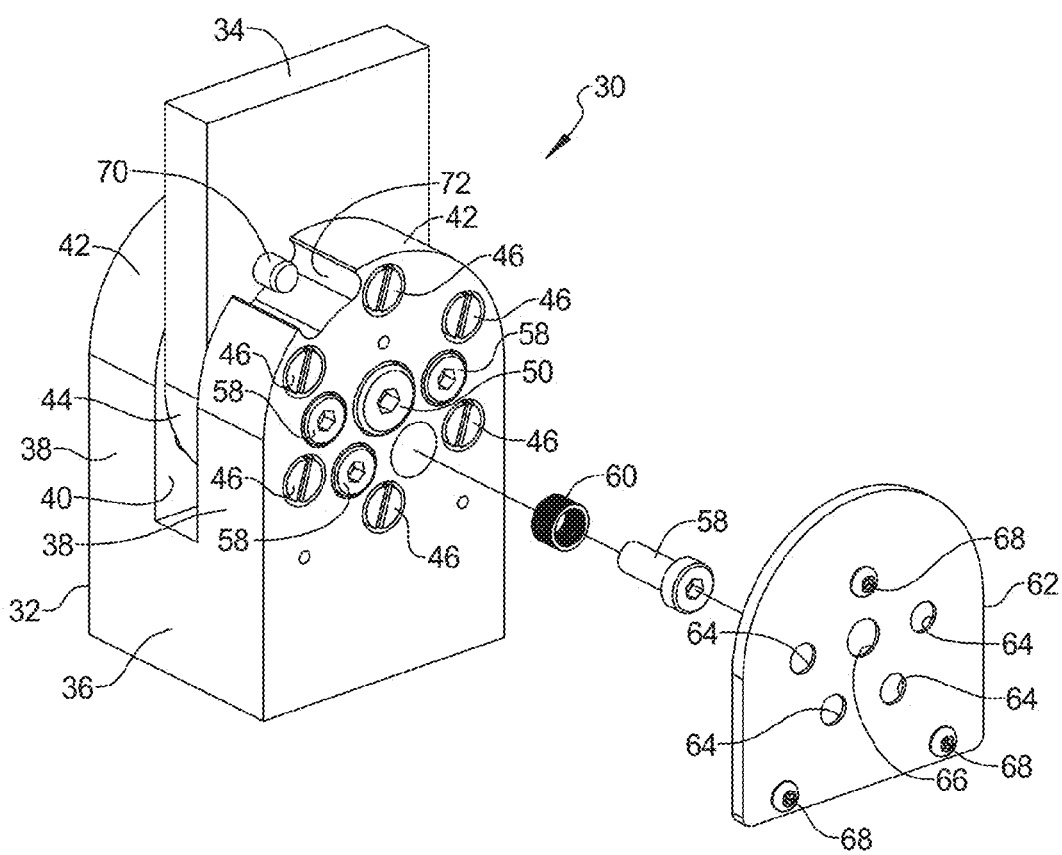
FIG. 8A is a partial exploded perspective view of the adjustable spine joint assembly of FIGS. 3A and 3B.
Figure 8B:
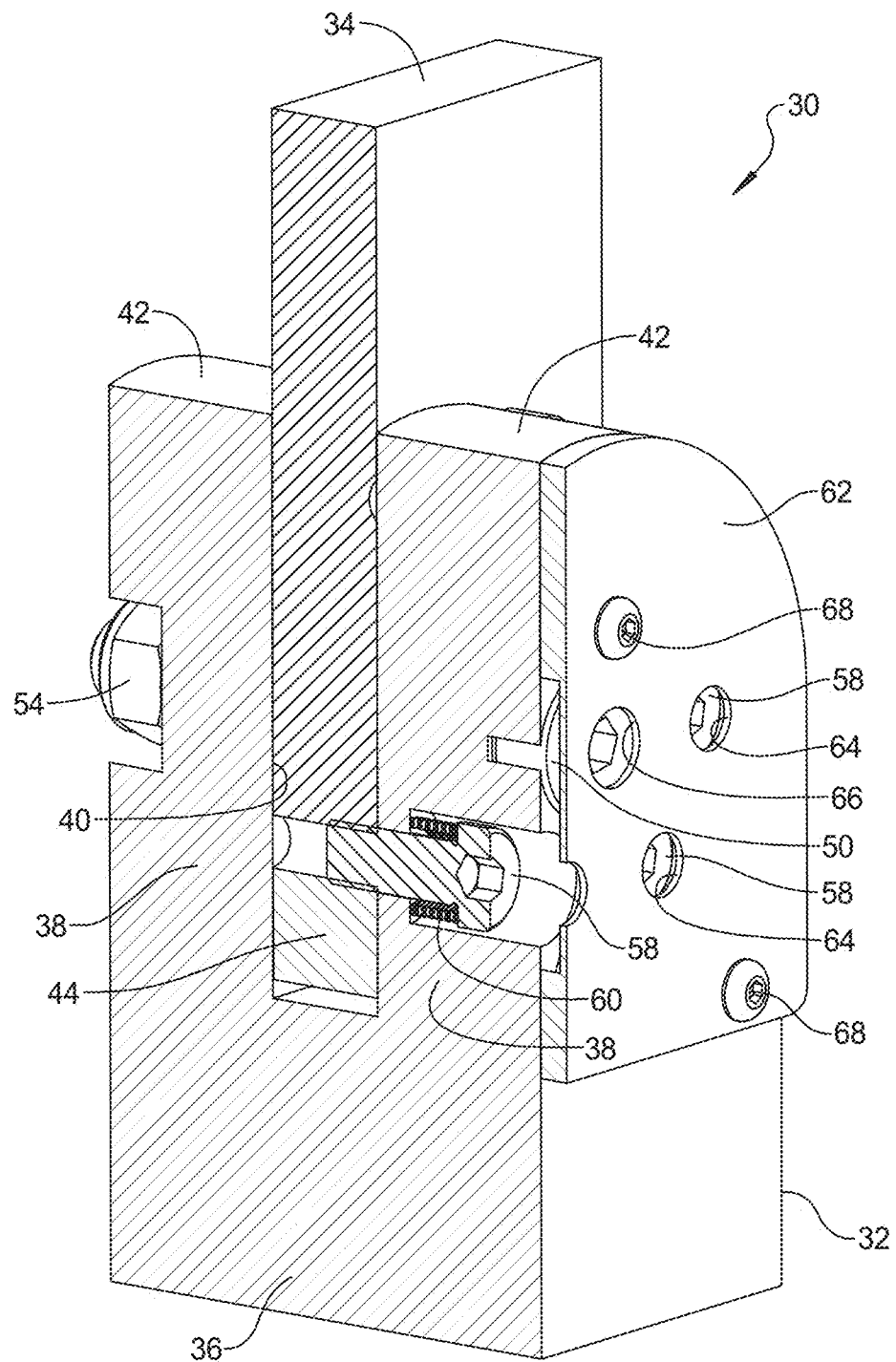
FIG. 8B is a fragmentary perspective view of the adjustable spine joint assembly of FIGS. 3A and 3B.

The adjustable spine joint assembly 30 further includes a cover plate 62. The cover plate 62 prevents the locking bolts 58 and the wave spring washers 60 from falling out of position in operation as illustrated in FIGS. 8A and 8B. The cover plate 62 is generally planar. The cover plate 62 includes a plurality of apertures 64 extending therethrough. The apertures 64 are arranged in an identical pattern to the locking bolts 58 such that the apertures 64 line up with the locking bolts 58. Each aperture 64 is large enough for a tool to access the corresponding locking bolt 58, but not large enough for the locking bolt 58 to fit through the aperture 64. The cover plate 62 also includes a center aperture 66 extending therethrough. The adjustable spine joint assembly 30 further includes a plurality of fasteners 68 extending through the cover plate 62 to fasten the cover plate 62 to one of the side portions 38. Specifically, the cover plate 62 is mounted to the side portion 38 of the lower member 32 with the locking fastener 68. It should be appreciated, that for the convenience of operation, the locking bolts 58 were all designed on one side for easy access.

Referring to FIG. 8A, the adjustable spine joint assembly 30 further includes a dowel pin 70 extending from the upper member 34 and a groove or slot 72 in the upper end 42 of one of the side portions 38 to limit the rotation within the desired range of motion so that the ATD torso may not move beyond.

In operation of the adjustable spine joint assembly 30, the upper thoracic assembly 27 is rotated relative to the pelvis/lumbar spine mounting assembly 28. When the upper thoracic assembly 27 is rotated to the desired torso angle position (S12, S9, N, E9), the ball plungers 46 will self-locate the corresponding detents 47. A "click" sound may be heard and the adjustable spine joint assembly 30 provides a tactile feedback that can be felt in operation. After the upper thoracic assembly 27 is positioned in the desired location, a tool (not shown) such as an Allen wrench may be used to tighten the locking bolt 58 corresponding to the current torso angle position (S12, S9, N, E9) and lock the joint so that the position of the upper thoracic assembly 27 relative to the pelvis/lumbar spine mounting assembly 28 will be held during high load crash testing.

Accordingly, the adjustable spine joint assembly 30 of the present invention uses ball plungers 46 and detents 47 to provide a self-locating mechanism. The adjustable spine joint assembly 30 of the present invention may include six sets of ball plungers 46 and detents 47 that may be spaced without interference within a small diameter. The adjustable spine joint assembly 30 of the present invention offers an opportunity to achieve a compact mechanical package that is feasible in an ATD.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An adjustable spine joint assembly for a crash test dummy comprising:
an upper member adapted to be operatively connected to an upper thoracic portion of a spine of the crash test dummy;
a lower member adapted to be operatively connected to a lower thoracic portion of the spine of the crash test dummy;
a center pivot bolt pivotally connected to said lower member and said upper member to allow rotational movement therebetween; and
a self-locating adjustment mechanism cooperating with said upper member and said lower member to allow adjustment between a plurality of fixed joint angles between said upper member and said lower member.

2. An adjustable spine joint assembly as set forth in claim 1 wherein said self-locating adjustment mechanism includes a plurality of ball plungers and a plurality of detents.

3. An adjustable spine joint assembly as set forth in claim 2 including a plurality of locking bolts.

4. An adjustable spine joint assembly as set forth in claim 3 including a plurality of wave spring washers, each of said locking bolts being associated with one of said wave spring washers.

5. An adjustable spine joint assembly as set forth in claim 4 including a cover plate connected to one side of said lower member.

6. An adjustable spine joint assembly as set forth in claim 2 wherein said upper member includes said detents.

7. An adjustable spine joint assembly as set forth in claim 2 wherein said lower member includes said ball plungers.

8. An adjustable spine joint assembly as set forth in claim 1 including a dowel pin connected to said upper member.

9. An adjustable spine joint assembly as set forth in claim 7 wherein said lower member includes at least one groove for receiving said dowel pin.

10. An adjustable spine joint assembly as set forth in claim 1 wherein said lower member has a yoke shape.

11. A crash test dummy comprising:
a body;
a spine operatively attached to said body; and
an adjustable spine joint assembly including an upper member operatively connected to an upper thoracic portion of said spine, a lower member operatively connected to a lower thoracic portion of said spine, a center pivot bolt pivotally connected to said lower member and said upper member to allow rotational movement therebetween, and a self-locating adjustment mechanism cooperating with said upper member and said lower member to allow adjustment between a plurality of fixed joint angles between said upper member and said lower member.

12. A crash test dummy as set forth in claim 11 wherein said adjustment mechanism includes a plurality of ball plungers and a plurality of detents.

13. A crash test dummy as set forth in claim 11 including a plurality of locking bolts.

14. A crash test dummy as set forth in claim 13 including a plurality of wave spring washers, each of said locking bolts being associated with one of said wave spring washers.

15. A crash test dummy as set forth in claim 11 including a cover plate connected to one side of said lower member.

16. A crash test dummy as set forth in claim 12 wherein said upper member includes said detents.

17. A crash test dummy as set forth in claim 12 wherein said lower member includes said ball plungers.

18. A crash test dummy as set forth in claim 11 including a dowel pin connected to said upper member.

19. A crash test dummy as set forth in claim 18 wherein said lower member includes at least one groove for receiving said dowel pin.

20. A crash test dummy as set forth in claim 11 wherein said lower member has a yoke shape.

21. An adjustable spine joint assembly for a crash test dummy comprising:

an upper member adapted to be operatively connected to an upper thoracic portion of a spine of the crash test dummy;

a lower member adapted to be operatively connected to a lower thoracic portion of the spine of the crash test dummy;

a center pivot bolt pivotally connected to said lower member and said upper member to allow rotational movement therebetween; and a self-locating adjustment mechanism cooperating with said upper member and said lower member to allow adjustment between a plurality of fixed joint angles between said upper member and said lower member, said self-locating adjustment mechanism includes a plurality of ball plungers in said lower member and a plurality of detents in said upper member, said ball plungers and said detents being arranged such that one set of said ball plungers engages a maximum of one set of said detents at a time.

\* \* \* \* \*